United States Patent [19]

Gaus et al.

[11] Patent Number: 4,954,922
[45] Date of Patent: Sep. 4, 1990

[54] PROTECTIVE SYSTEM FOR PORTABLE ELECTRICALLY POWERED APPARATUS

[76] Inventors: Harry Gaus, Schwanheimer Str. 93, Bensheim, Fed. Rep. of Germany, D-6140; Hagen Gross, Am Zollstock 29, Bad Homburg, Fed. Rep. of Germany, D-6380; Günter Schliebs, Claudiusweg 17A, Darmstadt, Fed. Rep. of Germany, D-6100

[21] Appl. No.: 252,515

[22] Filed: Sep. 30, 1988

[30] Foreign Application Priority Data

Apr. 23, 1988 [DE] Fed. Rep. of Germany ....... 3813796

[51] Int. Cl.⁵ .............................................. H02H 5/04
[52] U.S. Cl. ...................................... 361/42; 307/326
[58] Field of Search ..................... 361/42, 45, 46, 178, 361/191, 192, 194; 307/116, 114, 326

[56] References Cited

U.S. PATENT DOCUMENTS

| | | | |
|---|---|---|---|
| 4,464,582 | 8/1984 | Aragaki et al. | 307/118 |
| 4,589,047 | 5/1986 | Gous et al. | 361/42 |
| 4,709,293 | 11/1987 | Gershen et al. | 361/42 X |

FOREIGN PATENT DOCUMENTS

| | | |
|---|---|---|
| 0218847 | 8/1986 | European Pat. Off. |
| 2539279 | 4/1975 | Fed. Rep. of Germany. |
| 2631785 | 7/1976 | Fed. Rep. of Germany. |
| 3122232 | 4/1981 | Fed. Rep. of Germany. |

*Primary Examiner*—Derek S. Jennings
*Attorney, Agent, or Firm*—Fleit, Jacobson, Cohn, Price, Holman & Stern

[57] ABSTRACT

In an electrically powered apparatus, particularly a portable apparatus, having a flexible shielded main connection line (50) and an electronic protective device, said protective device is housed in the main connection plug (60) or in an adapter (61) to which the main connection line (50) can be coupled, wherewith said protective device serves as a safety device in the event of leakage of fluid into the apparatus or of current to ground or to protect the user. In order to provide intrinsic protection against damage or defects which may render the protective device itself ineffective, a holding current loop is provided which extends to the protected apparatus (30) via core conductors (21, 23) and shielding (22) of the main connection line, which holding current loop preferably also includes a probe (40, 41) in the protected apparatus, wherewith, when, regardless of the operating state of the protected apparatus (30), the holding current in the holding current loop falls below a lower limit or increases above an upper limit (depending on the type of failure event), the protective device (5–20) is triggered. Means are provided to prevent accidental or willful interposition of an inventive adapter (61) with an older consuming apparatus of a non-inventive unprotected type, and to prevent false triggering of the protective device.

21 Claims, 3 Drawing Sheets

PROTECTIVE SYSTEM FOR PORTABLE ELECTRICALLY POWERED APPARATUS

CROSS-REFERENCE TO RELATED APPLICATIONS

This application is a continuation-in-part application, which makes reference to, hereby incorporates herein, and claims the benefits under 35 USC §§199, 120, 363 and 365 of our earlier International Application entitled Schurtzeinrichtung für Elekrisch Betriebene Ger,uml/a/ te filed on Jan. 12, 1988 under the Patent Cooperation Treaty and assigned Ser. No. PCT/EP88/10016, which in turn claims priority on the basis of German application assigned Ser. No. P 37 02 970 filed on Feb. 02, 1987.

BACKGROUND OF THE INVENTION

Technical Field

The invention relates to electrically powered apparatus, particularly portable apparatus which operate with liquid media or can come into contact with liquid media, further which apparatus are releasably connectable by a flexible main connection line to power mains that are fixed at a site, said connection and which apparatus have an electronic protective device as a safety device in the event of leakage of fluid into the apparatus or of current to ground, to protect the user against shock.

Apparatus of this type include washing machines and dishwashers (e.g., German Patent No. 25 39 279), sump pumps and other immersion pumps for which the protective device serves as protection in the event of leakage of liquid into the electrical system, and whirlpool-type (Jacuzzi) massage apparatus (e.g., German Patent No. 26 31 785), and electrical kitchen appliances, hair dryers (e.g., U.S. Pat. No. 4,270,158), forced-air electric heaters, and irradiation lamps, particularly sunlamps, which may be used in wet areas, for which the protective device serves as protection in the event of shock hazard, for example, to prevent electrocution.

SUMMARY OF THE INVENTION

The sensing device of the electronic protective device is a probe. The protective switching in the case of a washing machine or dishwasher cuts off the water supply, and in the case of a household, kitchen, or workplace appliance, cuts off both conductors of the power mains from the apparatus. The circuit is broken by means of a magnetic valve or relay or by tripping of a circuit breaker which is ultimately, or redundantly, protected by a fusible wire.

Thus, in U.S. Pat. No. 4,270,158, a hair dryer is described wherein the protective device is distributed among three interacting modules: the protected apparatus itself which includes the probe, the main connection line which includes additional core conductors to transmit the signal from the probe, and the main connection plug which includes an electronic triggering circuit and the relay.

However, the protective device can become ineffective, with dangerous consequences, if damage occurs to the main connection line, particularly a break in a core conductor or a failure of the insulation. Then the conductor itself becomes a hazard. An attempt has been made with a device of the known type, to provide protection against mechanical damage by providing core conductors, individually or together, with double shielding.

However, such protection is not entirely reliable, because the broken core conductor may be one of the probe conductors.

When a break occurs in a power line core conductor the protected apparatus can not be operated. Nonetheless, the undamaged conductor may carry voltage to exposed parts of the apparatus (e.g., the heating element of a hair dryer, forced-air heater, or the like), thereby causing an accident, particularly since a naive user, aware of the fact that the device is inoperative, is likely to assume that it carries no voltage.

Accordingly, an underlying problem of the invention is to provide broad inherent safety in a device and apparatus of the described type, at minimal cost of the structure and circuitry, wherewith the currents in the apparatus will be shut off rapidly if the protective elements fail.

This problem is solved according to the invention by a combination of electronic and mechanical components having the features of an inherently safe (i.e., safe even in the event of its own failure) protective deice which not only provides the customarY protection offered by other, non-inherently-safe protective devices, viz. to irreversibly and rapidly disconnect all poles of the main voltage at the main plug when, for example, water penetrates into the apparatus housing, and does so before the water can provide a connection between the user and parts of the protected apparatus which are at substantial voltage; but also includes the main connection line, up to the main connection plug, in the protective system (in view of the fact that said line constantly bears main voltage); and the inventive combination provides such protection including the main connection line even in the face of breaks in core conductors or failure in insulation, which breaks or failures are undetectable by visual inspection under the sheathing of the mains connection line but which can disable a customary protective system.

The inclusion of the shielding of the main connection line in the system protected by and/or monitored by the protective device makes it impossible for an electric shock, to the user, to result merely from unintended wetting of the main connection line of a protected apparatus when such main connection line has defective insulation.

The probe, which is accommodated in the housing of the protected apparatus, can be monitored for its integrity if the holding current loop includes the conductor of the probe.

In the disclosed embodiment of the invention, complete protection is provided with the use of a main connection line having single shielding and two core conductors (and with the shielding being loosely wrapped and not densely woven), in contrast to known devices which require a main connection line having four core-conductors (two current-carrying conductors and two signal conductors) which is heavier, less flexible, and more expensive.

However, experience has shown that even such an improved protective device is still not safe against mischievous or otherwise improper access from the outside. If an emergency has occurred, i.e., the electronic protective system has responded and the protective switching device has been triggered, an electrician is then required to replace the main connection line and main connection plug. This is, of course, costly. Thus, the non-expert is tempted to avoid such replacement, and instead to remove the main connection plug which includes the offending (irreversibly triggered) protective device and replace it with an ordinary commercially available, inexpensive two- or three-pole main connection plug. This disables the probe in the protected apparatus and the signal conductor and holding-current conductor in the main connection line.

Accordingly, the second underlying problem of the invention is to modify the described protective device as to the disposition and housing of its components, without detracting from its functioning and advantages, such that no unsuspecting user is at any time threatened with a mortal hazard relating to contact or access.

This problem is solved, according to the invention, in a simple and inexpensive fashion by housing the circuitry, including the protective switching circuitry, in an adapter which is separate from the primary main connection line and main connection plug of the protected apparatus and which is inserted between the main connection line and the main socket. The mains connection line terminates in a three-pole plug. Alternatively, the adapter may be in the form of a special main connection socket.

If it is desired to prevent the user from erroneously assuming that protection can be obtained by using the inventive adapter with an ordinary, unprotected type of consuming apparatus (hereinafter "older apparatus"), the shape of the socket part of the adapter, and the shape of the power line connection plug of the protected apparatus may be varied from the standard shape so as to provide a lock-and-key-type fit, whereby an ordinary main connection plug can not be plugged into the adapter.

In this connection, the only modification required for the automatically controlled electronic switching circuit is a modification such that the circuit is only sensitized if the adapter and plug are physically coupled together, wherewith a holding current flows when current is flowing in the circuit. The means for accomplishing this modification may be mechanical or electrical.

Advantageously, a form-interlocking catch is provided between the adapter and the apparatus plug, in order to prevent withdrawal of the main connection line from the adapter while the adapter is plugged into a main connection socket and is under voltage (because if such withdrawal occurred it would simulate interruption of the holding current loop and would trigger the protective switching circuit).

This refinement of the inventive protective device, in addition to providing the desired protection against improper access or contact, offers a number of advantages for manufacturers, regulatory authorities (government or otherwise), and users.

The manufacturers of the protected apparatus and the electronic systems are not dependent on each other. The electronics in the adapter can be modified without rendering the protected apparatus obsolete. Various refinements may be used interchangeably. A "dead" adapter, in which the protective system has been triggered, may be readily replaced. The user is free to choose among the variety of adapter systems, and may confidently choose on the basis of price without being exposed to a use hazard.

BRIEF DESCRIPTION OF THE DRAWINGS

Exemplary embodiments and examples of use will be described hereinbelow, with reference to the drawings.

DETAILED DESCRIPTION OF THE DISCLOSED EMBODIMENTS

Figure 1:
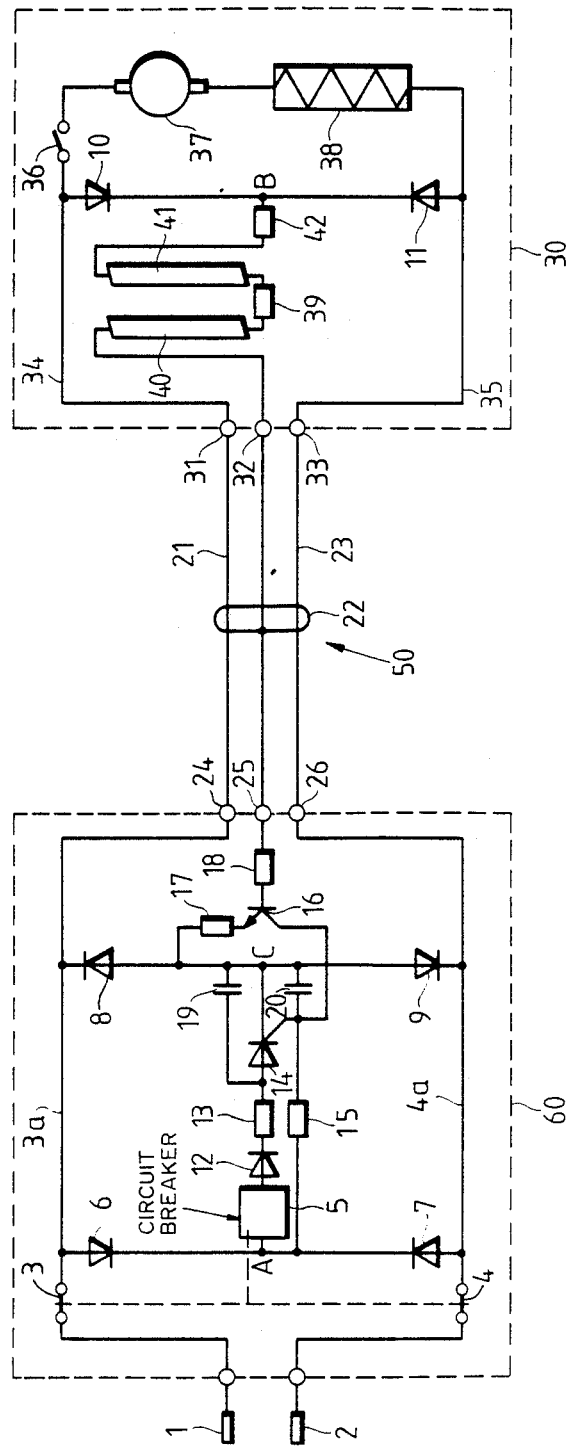
FIG. 1 is a circuit diagram of an apparatus with a main connection line, which apparatus has a protective device housed in the main connection plug.

FIG. 1 contains the circuit diagram for a protective device for an electrically powered apparatus 30 having a fan motor 37 and an air heating device 38. The apparatus may be, e.g., a hair dryer or a fan-type space heater. It is connected to a main connection plug 60 via a two-core shielded main connection line 50. The components 6-20 of the electronic protective circuit are housed in the plug 60.

The power leads, (3a, 4a) which pass from the contact pins (1, 2) via the switch contacts (3, 4) of a two-pole circuit breaker 5 lead to the terminals (24, 26) to which the core conductors (21, 23) of the main connection line 50 are attached. The circuit breaker, in series with a diode 12, a resistor 13, and a semiconductor switch comprising a thyristor 14, forms a diagonal (path A–C) of a diode H-bridge (diode quartet) (6–9). The resistor 13, together with the capacitor 19 connected parallel to the thyristor, forms a means of protection against overhead triggering of the thyristor when the consuming devices (37, 38) in the apparatus 30 are switched on. The RC branch (15, 20) to which the control electrode of the thyristor 14 is connected serves as a means of protection against short-duration disturbances in the power main. A transistor stage (16, 17) is connected between (i.e., across) the control electrode and base of the thyristor 14 (point C). The base of the transistor 16 is connected to a third terminal 25 via a resistor 18. The shielding 22 of the main connection line 50 is also connected to terminal 25.

On apparatus 30, the core conductors (21, 23) and shielding 22 of the main connection line 50 are connected to terminals (31, 33, 32, respectively) of apparatus 30. From terminals 31 and 33, the load circuit of the apparatus passes via t he internal power connection lines (34, 35) and the operating switch 36, and through the motor 37 and air heating device 38. A line leads from terminal 32 via open double conductors (40, 41) with resistor 39 connected between double conductors 40 and 41, further via a high-resistance protective resistor 42, to a branch comprised of opposed diodes (10, 11) which branch is connected between the power connection lines (34, 35).

It may be seen that the diodes (8, 9) of the diode bridge in the plug 60 form a second diode H-bridge with the diodes (10, 11) in the apparatus 30. The diagonal of this second bridge is comprised of the following components connected in series: transistor 16, base resistor 18, shielding 22, probe conductor 40 (probe shunt) resistor 39, probe conductor 41, and protective resistor 42. Considered as a unit, one thus has a holding current circuit for monitoring the entire apparatus for functionality, which circuit proceeds starting from (but not including) the electronic circuit in the main connection plug 60, and is comprised of the core conductors (21, 23) of the main connection line 50 (depending on the phase of the a.c. voltage in the main), the diode pair (10, 11) in the apparatus 30, and further, in the return branch, and the double conductors (40, 41) with the (probe) shunt resistor 39, further, the shielding 22 of the main connection line 50, and the base resistor 18 of the transistor stage (16, 17), with the transistor connected as an emitter-follower. The function of the diode 12 in the diagonal of the diode bridge (6–9) is to ensure that the pulsating d.c. voltage at the points A, B, and C has the same phase (i.e., passes through the null (point of the wave) at the same time).

While the protective system herein described constitutes a preferred embodiment of the present invention, it is to be understood that the invention is not limited to this precise form of the probe and the main connection line.

The circuit operates as follows:

1. As soon as the contact pins (1, 2) of the plug 60 are inserted into a mains connection socket, a small holding current of, e.g., 10 uA flows from the shielding 22 over the base resistor 18 and into the base of the transistor 16, thereby switching on this transistor. As a result, a current of, e.g., 200 uA flows in the circuit (15-16-17) between the points A and C, and this current keeps the voltage on the control electrode of the thyristor 14 at a value below the breakdown voltage (triggering voltage) (viz., keeps it at, e.g., 0.6 V d.c.).

2. If during at least one half cycle of the main voltage the holding-current circuit is broken by a break in at least one of the core conductors (21, 23) of the main connection line 50, or the shielding 22 of the main connection line 50, or by a connection defect at one of the terminals (24-26, 31-33), the transistor 16 will be in a blocking state, the voltage on the control electrode of thyristor 14 will increase above the breakdown value (e.g., will increase to 1 V d.c.), the thyristor will contact the diagonal A-C, and the circuit breaker 5 in diagonal A-C will be rapidly triggered, whereby the switch contacts (3, 4) of breaker 5 will be opened. As a result, the entire system will be cut off from the power source.

Advantageously, the circuit breaker is such that its "off" position is irreversible, so that the defect must be first corrected before the main connection circuit can again be closed. Such a circuit breaker is described, e.g., in European patent No. 88390.

3. If the impedance of the probe (40, 41) is sharply reduced due to water penetration into the apparatus 30, the holding current will increase substantially to a value above its pre-established upper limit as a result of which the current in the circuit (16, 17) will increase substantially, e.g., to 700 uA, such that in consequence of the voltage drop in resistor 17 the voltage on the control electrode of the thyristor 14 will increase again into the breakdown region and the thyristor will connect through.

In summary, the triggering of the thyristor in turn triggers the circuit breaker 5, as soon as the current in the holding current loop falls below a prescribed lower limit or increases above a prescribed upper limit.

The following type of accidents will lead to triggering of the circuit breaker:

Interruption of the power loop (e.g., due to a break in a conductor or failure in a connection):

The loop current will fall below the lower limit for the holding current, namely to zero.

Short circuiting of one of the core conductors of the main connection line 50 to the shielding (e.g., due to insulation failure); or Ground leakage of the shielding (e.g., due to damaged sheathing); or Contact with liquid (e.g., due to penetration of water into the apparatus or immersion of the main connection line while the line is damaged):

In each of the preceding three situations, the loop current will increase into the range above the upper limit for the holding current.

Figure 2:
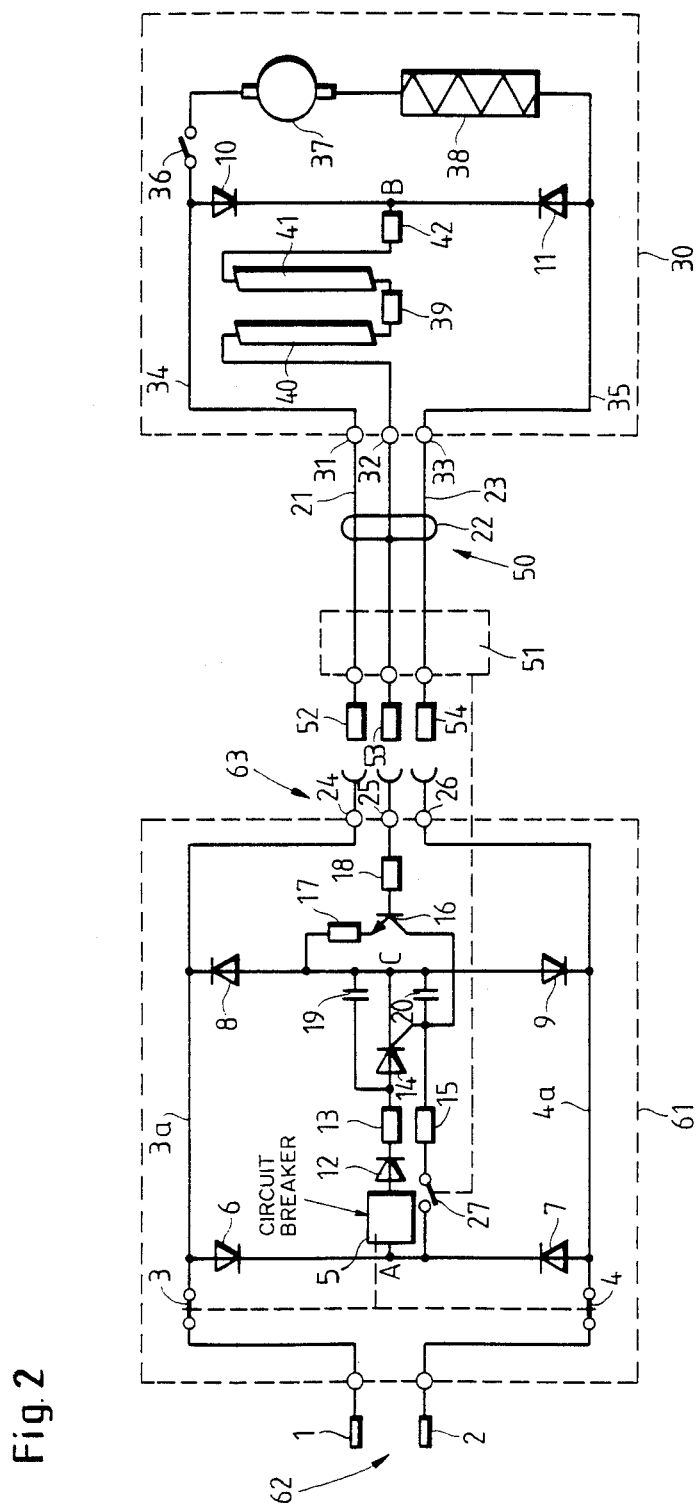
FIG. 2 is a circuit diagram of an apparatus which has a protective device housed in an adapter.

FIG. 2 is the circuit diagram for an electrically powered apparatus 30 having a fan motor 37 and an air heating device 38, which apparatus is, for example, a hair dryer or a fan-forced heater. The apparatus 30 can be connected to an adapter 61 via a two-conductor shielded main connection line 50. The adapter houses the components (6–20) of the electronic protective circuit, and has a plug part 62 for plugging it into an ordinary wall socket (not shown).

The main connection plug 51, on apparatus 30, may have a structure of the type of standard safety plug, with the shielding 22 of the main connection line being connected to the safety contact. In order to prevent connection of older apparatus to the adapter, its contour must be slightly modified, for example, by being flattened at the foot. In order to close the switch 27, a cam or the like is provided. Preferably, the adapter housing and plug should be interlockable, preferably permanently (i.e., so that they can not be separated without damaging the catch means). The switch-actuating cam and the catch means may both be readily accommodated in or on the wall of the pan-shaped socket 63 (shown in FIGS. 3 and 4) on the adapter. These structural details are not part of the claimed matter of the invention, and one skilled in the art may obtain sufficient examples from the literature concerning electrical installations and apparatus.

In place of the mechanical switch 27, a switching transistor may be provided, whereby the holding-current voltage causes the transistor to be in an "on" state which passes current as soon as the holding-current voltage appears on the contact 25, that is, as soon as the apparatus 30 is connected to socket 63. However, this electronic sensitization is more costly.

The operation of the circuit of FIG. 2 differs from that of FIG. 1 only in that, regardless of whether the apparatus 30 is connected to the adapter 61, the diode bridge (6–9) will have a voltage applied to it as soon as the contact pins (1, 2) of the adapter are inserted into a main connection socket. However, no control voltage will appear on the control electrode of the thyristor 14 as long as the switch 27 is open. Switch 27 is closed automatically when the plug 51 is inserted in the socket in the adapter. This causes the automatically controlled electronic switching circuit to be "sensitized".

Figure 3:
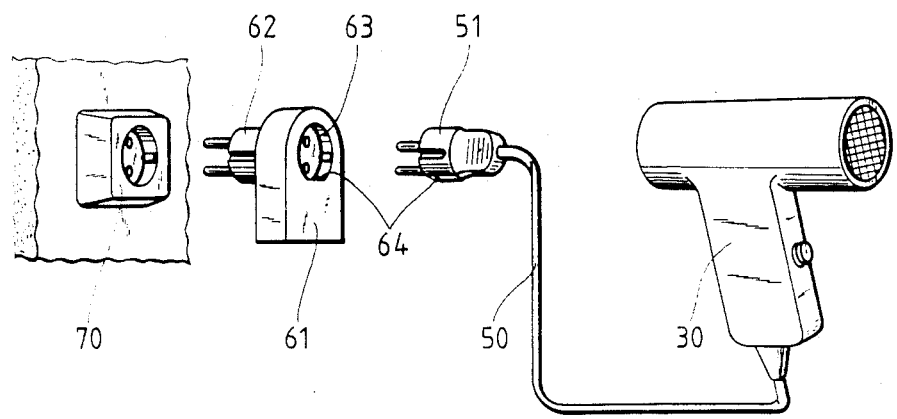
FIG. 3 is an illustration of the apparatus of FIG. 2.
Figure 4:
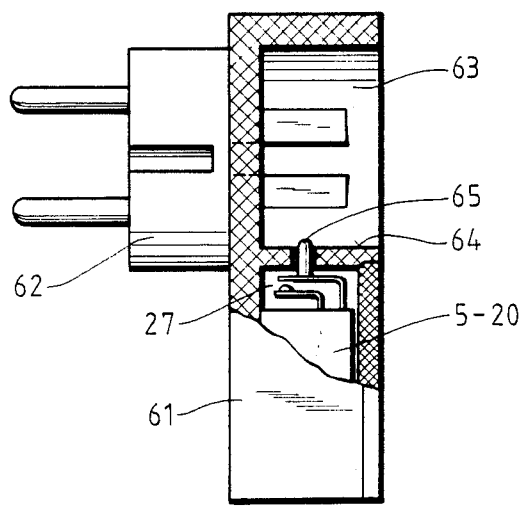
FIG. 4 is a longitudinal cross-section through the adapter of FIG. 3.

The embodiment with a replaceable protective device (i.e., adapter as per FIG. 2) is illustrated in FIG. 3. The adapter 61 is inserted between the apparatus 30 (with its main connection line 50) and the wall socket 70. The three-pole plug part 62 on adapter 61 fits into the wall plug, and the socket part 63 receives the three-pole main connection plug 51. According to the German standard, the socket opening and the base plate of the plug should be round in shape; however in the embodiment shown, these are flattened at one side 64 so that only an apparatus 30 having a suitable holding current loop can be connected to the adapter 61. If an older apparatus (not having the probes) is sought to be employed, it can be connected to the wall plug as usual.

A switch-actuating rod 65 (FIG. 4) for a switch 27 is disposed in the flat wall 64 of the socket part 63 of the adapter. The function of switch 27 may be seen from the circuit diagram of FIG. 2. It may be readily seen that the automatically controlled electronic switching circuit in adapter 61 (of FIG. 2) differs from the circuit in the main connection plug 60 in FIG. 1 only by the presence of this switch 27. Only if an apparatus 30 is connected to the adapter 61 is the switch 27 closed (via plug 51 and switch-actuating rod 65) and the controlled switching circuit is sensitized.

The two parts, adapter 61 and apparatus 30, mechanically and electrically connected, form a system which, by virtue of its interior electrical "organization", performs the superordinate function of protecting the user in the event of penetration of moisture in the apparatus 30. At the same time, individually the adapter and apparatus can perform their ordinary functions of providing electric power to match the type of the intermediate socket, and delivering the performance of an electrically powered consuming device.

The advantages of the inventive protective device are low manufacturing cost, high inherent safety, broad protection of the user of electrical apparatus powered through a flexible main connection line, in the home and in the workplace, particularly with regard to wet areas around a home, bath, hospital (e.g., hydrotherapy devices), etc., and suitability for use with electrically triggerable circuit breakers of any design.

The only parts of the system which are to be provided in the protected apparatus itself are the moisture probe and its connections. The circuit elements required for connection of the protected apparatus with the core conductors and shielding of the main connection line may also be housed in a watertight insertion socket, or plug, in the main connection line, so that only four connecting terminals are required (two for the double conductors of the probe and two for the power connection lines). The inventive, automatically controlled electronic switching circuit, which may vary in details from that of the exemplary embodiments, can be housed in a volume of, e.g., 20×20×10 mm, so that the dimensions of a main connection plug containing it will be only slightly larger than normal.

What is claimed is:

1. An electrically powered apparatus having a flexible shielded two conductor power cord and an electronic protective system housed in a main connection plug or in an adapter connectable to a main power source, said electronic protective system being comprised of:
   (a) A probe contained in the apparatus, which probe exhibits a change of its electrical impedance in the presence of a liquid;
   (b) An automatically controlled electronic switching circuit powered by the main power source, said switching circuit having connected to its input a signal line leading from the probe via the shielding of the power cord, wherewith said switching circuit is triggered if the impedance of the probe changes by a prescribed amount; and
   (c) A protective switch inserted in the leads of the plug or adapter, which protective switch is triggered by electrical current occurring when the switching circuit is triggered;
   characterized by a control current loop being provided which is formed from the switching circuit to the protected apparatus and the probe of the apparatus, and returning via the shielding of the power cord back to the electronic circuit, which control current loop carries a direct current regardless of the operating state of the protected apparatus, and wherewith, as long as the current through said loop is between a lower and an upper limit value, the electronic circuit is not triggered.

2. An apparatus according to claim 1, wherein said probe is constructed in the form of a pair of spaced apart conductors, characterized in that on the apparatus side the control current passes through a high valued resistor which creates a conductive path between the spaced apart conductors, and further passes through a branch containing opposed diodes connected to internal power leads of the apparatus.

3. An apparatus according to claim 2, characterized in that the current loop includes the spaced apart conductors of the probe.

4. A protective system according to claim 1, characterized in that the electronic circuit and the protective switch are disposed in an adapter interposed between a main connection socket of the main power source and connection plug of said power cord.

5. A protective system according to claim 4, characterized by a catch means for locking said adapter and apparatus plug together.

6. A protective system according to claim 4, characterized in that the automatically controlled switching circuit is additionally blocked if the main connection plug and adapter are not in the coupled state.

7. A protective system according to claim 1 wherein said switching circuit is, characterized by an emitter-follower transistor stage, a diode H-bridge for providing direct current power to the electronic circuit, which bridge is connected between main connection leads downstream of theof the contacts of the protective switch, wherein one diagonal of said bridge contains an electrical trigger element associated with the protective switch in series with a shunt arrangement comprised of a thyristor and a protective capacitor, wherewith a control electrode of the thyristor is connected to said emitter-follower transistor stage, and wherewith the return path of the control current loop leads via the shielding of the power cord and is connected to an input of said transistor stage.

8. A protective system according to claim 4, characterized by a resistor connected in series with a second capacitor in a branch parallel to the diagonal, the control electrode of the thyristor and the emitter collector circuit of the transistor being connected to a point between the resistor and second capacitor.

9. A protective system according to claim 7, characterized in that a switch element is included in the branch whereby, when the power cord plug is plugged into the adapter, said switch element is closed to pass electrical current through said branch.

10. An electrical protective system for electrically powered, portable apparatus which apparatus has a flexible power cord, said protective system serving as a shock hazard prevention in the event of leakage of fluid into the apparatus or of current to ground, or to protect the user, said electronic protection system comprised of:
   (a) a probe in the protected apparatus, which probe exhibits a change in its electrical impedance in the presence of a liquid;
   (b) an automatically controlled electronic switching circuit powered by the main power source, said circuit having connected to its input a signal line leading from the probe via the power cord;

(c) a protective mechanical switch inserted in a main connection line of the apparatus, which switch is released by an electrical current occurring when the electronic circuit is triggered;

(d) a two conductor core power cord with a further wire disposed interiorly of the external coating of said cord and serving as said signal line; and (e) wherewith a control current loop is provided from said electronic circuit alternately via one of the core conductors of the power cord to the apparatus and the probe within the apparatus, and returning via the signal conductor wire of the power cord back to the electronic circuit, which control current loop carries a direct current, regardless of the operating state of the protected apparatus, and wherewith, as long as the current through said loop is between a lower and an upper limit value, the electronic circuit is not triggered.

11. A protective system according to claim 10, characterized by an adapter interposed between the apparatus plug and a main connection socket, wherewith the automatically controlled switching circuit is disposed in said adapter, wherewith a holding current loop extends from said switching circuit via the plug and the core conductors of the main connection line to the protected apparatus, and thence, in series with the probe and the signal conductor wire of the main connection line, back to the adapter, and wherewith a d. c. current flows through said holding current loop regardless of the operating state of the protected apparatus.

12. An electrical protective system, comprising:
probe means disposable about an electrically powered apparatus, for exhibiting a change of electrical impedance in the presence of liquid;
a three wire main connection line terminating with a plug;
first rectifying means for providing a first bridge connecting a first end of said probe means to both of a pair of internal power leads coupling the apparatus to said main connection line;
second and third rectifying means connected to said first rectifying means through two wires of the main connection line for providing a full wave bridge between both terminals of a main power source providing electrical power to the apparatus, and for providing a rectified current between two nodes of said full wave bridge and said probe;
electronic switching means coupled between said two nodes of said full wave bridge and a second end of said probe means through a third wire of said main connection line, for interrupting electrical current conduction between both of the terminals of the main power source and said main connection line whenever the rectified current through said second end of said probe means rises above a higher value.

13. The protective system of claim 12, further comprising a main connecting plug housing said full wave bridge and electronic switching means while coupling said main connection line to the main power source.

14. The protective system of claim 12, further comprising:
adapter means for housing said full wave bridge and electronic switching means, connecting said plug terminating said main conduction line to the main power source; and means for automatically sensitizing said switching means whenever said plug is coupled to said adapter.

15. The protective system of claim 14, further comprising catch means for locking said adapter and plug together.

16. The protective system of claim 14, said second and third rectifying means comprises a diode H-bridge providing electrical power to said electronic switching means and said electronic switching mean is coupled across one diagonal of said H-bridge; and
said electronic switching means comprises a thyristor and a protective capacitor coupled in parallel to a first one of said two nodes, and a transistor connected in an emitter-follower configuration with a base electrode coupled to said second end of said probe and with an emitter electrode coupled to said control electrode of the thyristor.

17. The protective system of claim 12, wherein:
said second and third rectifying means comprises a diode H-bridge providing electrical power to said electronic switching means and said electronic switching means is coupled across one diagonal of said H-bridge; and
said electronic switching means comprises a thyristor and a protective capacitor coupled in parallel to a first one of said two nodes, and a transistor connected in an emitter-follower configuration with a base electrode coupled to said second end of said probe and with an emitter electrode coupled to said control electrode of the thyristor and said emitter electrode of said emitter follower of said emitter follower transistor stage.

18. The protective system of claim 17, characterized by:
an adapter interposed between the power cord plug and a main connection socket, wherewith the electronic circuit is disposed in said adapter, wherewith a control current loop extends from said circuit via the plug and the core conductors of the power cord to the apparatus, and thence in series with the probe and the signal conductor wire of the power cord back to the adapter, and wherewith a direct current flows through said control current loop regardless of the operating state of the protected apparatus.

19. A protective system of claim 17, further comprising a resistance and a second capacitance coupled in series between said two nodes with a junction between said resistance and said second capacitance being coupled to said control electrode.

20. An electronic protective system, comprised of:
(a) a probe contained in an apparatus, said probe exhibiting a change of its electrical impedance in the presence of a liquid;
(b) an electric power cord having two conductors surrounded by an electrically conducting shield and terminating in a plug;
(c) an automatically controlled electronic switching circuit disposed in said plug or in an adapter and powered by a main power source, the input of said switching circuit being connected to said probe via said shield of said power cord, wherewith said switching circuit is triggered if the impedance of the probe changes by a prescribed amount; and
(d) a protective switch inserted in the leads of said plug or adapter, which protective switch is triggered by electrical current occurring when the switching circuit is triggered;

(e) a control current loop, contained in said protective system, provided from said switching circuit to a protected apparatus and said probe of the apparatus, and returning via said shield of the power cord back to the electronic circuit, said control current loop carrying a direct current regardless of the operating state of the protected apparatus, and wherewith, as long as the current through said loop is between a lower and an upper limit value, the electronic circuit is not triggered.

21. An electrical protective system for electrically powered, portable apparatus, comprised of:

(a) a probe in the protected apparatus, said probe exhibiting a change in its electrical impedance in the presence of a liquid;

(b) a two-core conductor power cord with a shield of said cord serving as a signal conductor from said probe;

(c) an electronic circuit powered by a main power source, said circuit having connected to its input a signal line leading from the probe via said shield of the main power cord, with a switch being released by an electrical current occurring when the electronic circuit is triggered by the impedance of said probe changing by a prescribed amount; and (d) a control current loop provided from said electronic circuit alternately via one of the core conductors of the power cord to the apparatus and the probe within the apparatus, and returning via the shield of the power cord back to the electronic circuit, which control current loop carries a direct current, regardless of the operating state of the protected apparatus, and wherewith, as long as the current through said loop is between a lower and an upper value, the electronic circuit is not triggered.

* * * * *